C. E. LORD.
DYNAMO ELECTRIC MACHINE OF THE INCLOSED TYPE.
APPLICATION FILED MAR. 30, 1907.
908,686.
Patented Jan. 5, 1909.
2 SHEETS—SHEET 1.
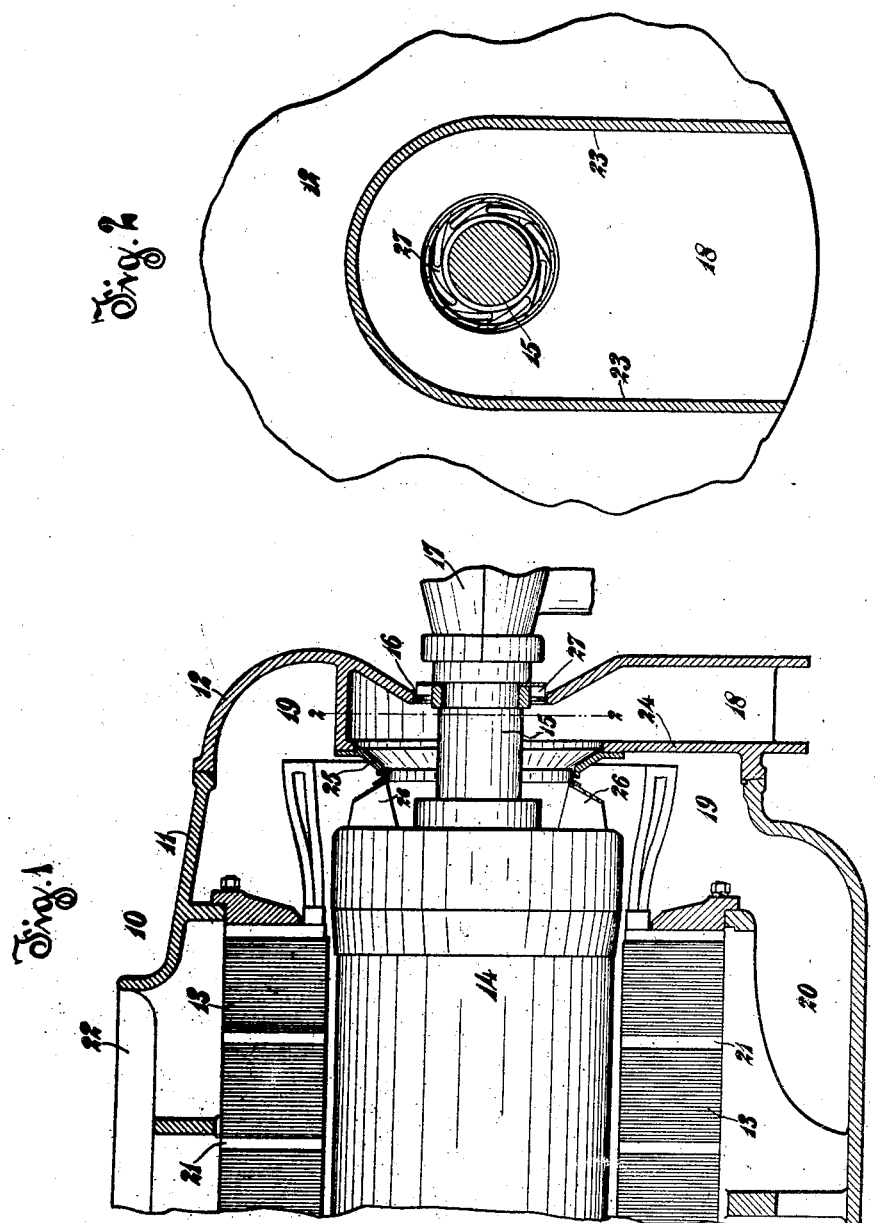
Witnesses
Inventor
Chas. E. Lord

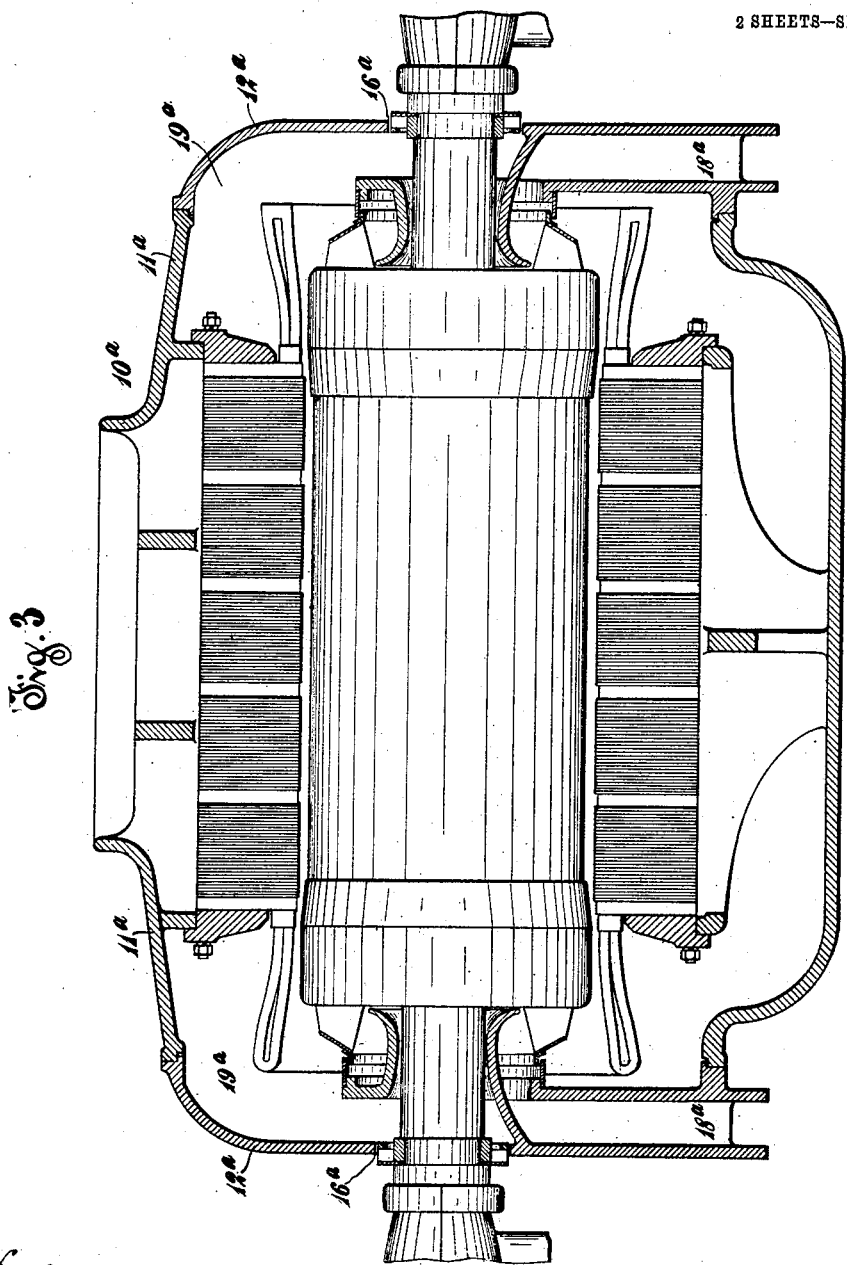

UNITED STATES PATENT OFFICE.

CHARLES E. LORD, OF NORWOOD, OHIO, ASSIGNOR TO ALLIS-CHALMERS COMPANY, A CORPORATION OF NEW JERSEY.

DYNAMO-ELECTRIC MACHINE OF THE INCLOSED TYPE.

No. 908,686.   Specification of Letters Patent.   Patented Jan. 5, 1909.

Application filed March 30, 1907. Serial No. 365,443.

*To all whom it may concern:*

Be it known that I, CHARLES E. LORD, a citizen of the United States, residing at Norwood, in the county of Hamilton and State of Ohio, have invented certain new and useful Improvements in Dynamo-Electric Machines of the Inclosed Type, of which the following is a full, clear, and exact specification.

My invention relates to machines or apparatus through which a circulation of air is maintained and particularly to inclosed dynamo-electric machines which are cooled by a forced circulation of air.

It is common practice to inclose certain types of dynamo-electric machines in housings or casings through which air is forced to dissipate the heat generated in the machines. The circulation of air is usually maintained through the housing by fans or blowers on the shaft or rotating element, the air being led into the housing through admission chambers which are located at the ends of the housing and extend upward from the bottom thereof to the shaft. The shaft passes through the walls of the housing and is supported in bearings at the ends thereof. Although the walls of the housing fit closely around the shaft there is a liability that warm air, or air laden with moisture or oil, will be drawn into the housing through the annular clearance spaces between the shaft and the walls of the housing.

The object of my invention is to prevent a leakage of air into the housing through the annular clearance openings or spaces between the shaft and the walls of the housing. I accomplish this object by providing on the shaft within or adjacent the shaft openings in the walls of the housing, fans or blowers which force air outward through said annular clearance spaces so as to counteract or overcome any tendency for a leakage inward.

For a better understanding of my invention, reference is had to the accompanying drawings in which—

Figure 1 is a partial sectional elevation of an inclosed dynamo-electric machine equipped with my invention; Fig. 2 is a section along the line 2—2 of Fig. 1 looking in the direction indicated by the arrows; and Fig. 3 is a sectional elevation of an inclosed dynamo-electric machine equipped with my invention, the construction of the housing being slightly different from that shown in Figs. 1 and 2.

Referring first to Figs. 1 and 2, I have shown at 10 a common form of housing consisting in this instance of a main or middle portion 11 and end portions 12. I have in this case shown only one end of the machine and housing, but it will be understood that the construction at both ends is the same. The main or middle portion of the housing supports the core 13 of the stationary armature of the dynamo-electric machine, in this case a turbo-alternator. The rotary field magnet 14 is mounted on a shaft 15 which extends through shaft openings 16 in the walls of the end portions of the housing, and is supported in bearings 17.

The housing is provided at each end with an air admission chamber 18 and an air receiving chamber 19 which communicate with a receiving chamber 20 at the bottom of the housing. The core is provided with circumferential ventilating passageways 21 which communicate with the receiving chamber 20 and with an exhaust opening or chimney 22 at the top of the housing.

Each air admission chamber 18 is formed or inclosed by a portion of the end wall of the housing, a flange 23 on the inner side of the end wall, which flange extends from the bottom of the housing upward on each side and over the shaft, and an inner wall 24 between the side portions of the flange. A ring 25 mounted on the face of the flange 23 and inner wall 24 forms with the shaft an annular air passageway. Mounted on each end of the rotating element 14 adjacent said annular passageway are fans or blowers 26 which cause the air to pass through the housing and dynamo-electric machine.

It is seen that in the construction of housing here shown the shaft extends directly through the walls of the admission chamber from which the air is exhausted by the fans 26. To prevent a leakage of air through the annular spaces or openings between the shaft and walls of the housing I provide on the shaft directly within the shaft openings or adjacent thereto small fans or blowers 27 which are so constructed as to create a circulation of air from the admission chambers outward through said annular openings. The construction of these fans is immaterial, so long as they produce the proper flow of air either radially, as shown or axially of the shaft. It is seen that the walls of the housing fit closely around the fans or blowers 27.

In Fig. 3 I have shown a slightly different form of housing. The housing 10ª consists as in the first instance of a main or central portion 11ª and end portions 12ª. The housing here shown differs from the housing shown in Figs. 1 and 2 in the construction and arrangement of the admission chambers. The admission chambers 18ª as in the first instance are located at the ends of the housing and extend from the bottom of the housing upward around the shaft. The upper ends of the admission chambers in this case extend outward from the end walls of the housing and are in the form of annular passageways which completely encircle the shaft and are formed or inclosed by walls which are independent of the shaft and end walls of the housings. It is seen that the shaft openings 16ª are not in the walls of the admission chambers but in the walls of the receiving chamber 19ª and that said receiving chambers include the spaces between the upper portions of the admission chambers and the end walls of the housing around the shaft and shaft openings. It will be evident that as the air is forced into the receiving chambers 19ª by the fans, the pressure on the inner sides of the end walls of the housing will be slightly greater than on the outer sides of said walls and that there will be little or no tendency for the air to leak into the housing through the shaft openings. To decrease still further the liability of leakage of air inward through the annular spaces between the shaft and walls of the housing, I mount on the shaft within said shaft openings fans or blowers 27ª which tend to force the air outward from the receiving chambers.

It is seen that in both constructions air can enter the housing only through the admission openings in the lower portions of the admission chambers and all the air that passes through the housing and machine comes from a source of supply free from oil, moisture, dust and other foreign matter.

I do not desire to be confined to the exact details shown but aim in my claims to cover all modifications which do not involve a departure from the spirit and scope of my invention.

What I claim as new and desire to secure by Letters Patent is:—

1. In combination, a housing or casing, a shaft extending through openings in the walls of the housing, means for maintaining an air pressure in said housing, and separate means for forcing air outward through the shaft openings.

2. In combination, a housing or casing, a shaft extending through the wall of the housing, means for maintaining a fluid pressure in the housing, and separate means comprising fans or blowers for preventing a leakage of air inward through the clearance space between the shaft and surrounding wall of the housing.

3. In combination, a housing or casing, a shaft extending through openings in the walls of the housing, means for maintaining a circulation of air through said housing, and fans or blowers mounted on the shaft within the shaft openings in the walls of the housing for forcing air outward through the annular clearance spaces between the shaft and surrounding walls of the housing.

4. In combination, a shaft, a housing or casing through which said shaft extends, said housing or casing comprising an admission chamber having an annular opening or passageway around the shaft, means for causing a circulation of air through said admission chamber, and fans or blowers mounted on the shaft adjacent the walls of the housing for preventing a leakage of air inward around the shaft.

5. In combination, a shaft, a housing or casing through which said shaft extends, said housing or casing comprising a receiving chamber and admission chambers having annular openings or passageways around the shaft, means operated by said shaft for causing the circulation of air from the admission chambers to the receiving chambers, and separate fans or blowers mounted on the shaft for causing a circulation of air outward through the clearance spaces about the shaft.

In testimony whereof I affix my signature, in the presence of two witnesses.

CHARLES E. LORD.

Witnesses:
A. F. KWIS,
FRED J. KINSEY.